(12) United States Patent
Ito et al.

(10) Patent No.: US 10,895,302 B2
(45) Date of Patent: Jan. 19, 2021

(54) DAMPER DEVICE

(71) Applicant: AISIN AW CO., LTD., Anjo (JP)

(72) Inventors: Kazuyoshi Ito, Tsushima (JP);
Akiyoshi Otsuki, Anjo (JP); Yuichiro Hirai, Okazaki (JP); Masaki Wajima, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 685 days.

(21) Appl. No.: 15/303,896

(22) PCT Filed: Apr. 20, 2015

(86) PCT No.: PCT/JP2015/061963
§ 371 (c)(1),
(2) Date: Oct. 13, 2016

(87) PCT Pub. No.: WO2015/166828
PCT Pub. Date: Nov. 5, 2015

(65) Prior Publication Data
US 2017/0045113 A1      Feb. 16, 2017

(30) Foreign Application Priority Data

Apr. 30, 2014   (JP) ................................ 2014-093747
Dec. 9, 2014    (JP) ................................ 2014-249284

(51) Int. Cl.
*F16H 45/02*         (2006.01)
*F16F 15/123*        (2006.01)
(Continued)

(52) U.S. Cl.
CPC .......... *F16F 15/12353* (2013.01); *F16D 3/12* (2013.01); *F16F 15/12373* (2013.01);
(Continued)

(58) Field of Classification Search
None
See application file for complete search history.

(56) References Cited

U.S. PATENT DOCUMENTS 4,360,352 A * 11/1982 Lamarche ........... F16F 15/1234
                                                192/213
4,702,721 A * 10/1987 Lamarche ......... F16F 15/12313
                                                192/212
(Continued)

FOREIGN PATENT DOCUMENTS

DE     102008032459 A1    2/2009
DE     102012214680 A1 *  4/2013  ............ F61F 15/123
(Continued)

OTHER PUBLICATIONS

Communication dated May 4, 2017, from the European Patent Office in counterpart European application No. 15785558.6.
(Continued)

*Primary Examiner* — Charles A Fox
*Assistant Examiner* — Ryan P Dodd
(74) *Attorney, Agent, or Firm* — Sughrue Mion, PLLC

(57) ABSTRACT

In a damper device, a dynamic damper is coupled to a first intermediate member, first and second inner-side springs that act in series with each other are straight coil springs disposed between a second intermediate member and a driven member so that outward movement of the springs in a radial direction of the damper device is restricted at respective both ends, and a gap is formed between each body portion of the first and the second inner-side springs and the second intermediate member or a spring abutment portion of the driven member.

20 Claims, 6 Drawing Sheets

(51) Int. Cl.
*F16F 15/14* (2006.01)
*F16D 3/12* (2006.01)
*F16F 15/121* (2006.01)

(52) U.S. Cl.
CPC ...... *F16F 15/1414* (2013.01); *F16F 15/1217* (2013.01); *F16F 15/12313* (2013.01); *F16F 15/12366* (2013.01); *F16H 45/02* (2013.01); *F16H 2045/0231* (2013.01); *F16H 2045/0263* (2013.01)

(56) References Cited

U.S. PATENT DOCUMENTS

| | | | | |
|---|---|---|---|---|
| 5,377,796 | A * | 1/1995 | Friedmann | F16F 15/13423 |
| | | | | 192/213 |
| 8,047,922 | B2 * | 11/2011 | Maienschein | F16F 15/12366 |
| | | | | 464/68.8 |
| 8,695,771 | B2 | 4/2014 | Matsuoka et al. | |
| 8,839,924 | B2 * | 9/2014 | Takikawa | F16H 45/02 |
| | | | | 192/213.2 |
| 9,133,906 | B2 * | 9/2015 | Takikawa | F16F 15/145 |
| 9,605,729 | B2 * | 3/2017 | Kawahara | F16F 15/1428 |
| 2004/0216979 | A1 * | 11/2004 | Yamashita | F16F 15/12366 |
| | | | | 192/212 |
| 2009/0272108 | A1 * | 11/2009 | Degler | F16F 15/12353 |
| | | | | 60/338 |
| 2010/0133063 | A1 * | 6/2010 | Degler | F16F 15/12366 |
| | | | | 192/30 V |
| 2012/0080280 | A1 | 4/2012 | Takikawa | |
| 2014/0008174 | A1 * | 1/2014 | Tomiyama | F16H 45/02 |
| | | | | 192/203 |
| 2015/0023781 | A1 * | 1/2015 | Takikawa | F16H 45/02 |
| | | | | 415/119 |

FOREIGN PATENT DOCUMENTS

| | | |
|---|---|---|
| DE | 102012214680 A1 | 4/2013 |
| JP | 2009-293671 A | 12/2009 |
| JP | 2014-070647 A | 4/2014 |
| JP | 2014-152814 A | 8/2014 |
| WO | 2013/161493 A1 | 10/2013 |

OTHER PUBLICATIONS

International Search Report of PCT/JP2015/061963 dated Jul. 7, 2015.

* cited by examiner

DAMPER DEVICE

TECHNICAL FIELD

The present disclosure relates to a damper device that includes a plurality of rotational elements, elastic bodies that transmit torque between the plurality of rotational elements, and a dynamic damper.

BACKGROUND ART

Conventionally, there is known, as a damper device of this type, a damper device that includes an output plate that rotates together with a turbine, a first coil spring that elastically couples a piston of a lock-up clutch and the output plate in a rotational direction, an inertia member that is provided so as to be relatively rotatable with respect to the output plate, and a second coil spring that is disposed on a radially inner side of the first coil spring and elastically couples the inertia member and the output plate in a rotational direction (see, for example Patent Document 1). The inertia member includes an annular plate member and an inertia member main body that is fixed to an outer peripheral portion of the plate member by a rivet. The output plate includes a first output plate and a second output plate, which support the plate member of the inertia member in an axial direction, and the plate member of the inertia member is supported in a radial direction by a first fastening portion provided on an inner peripheral portion of the first output plate. Furthermore, the second coil spring is disposed inside a window hole formed on the plate member so as to be positioned on a radially inner side of the inertia member main body and is supported by the first output plate and the second output plate such that the second coil spring can be deformed elastically. Thereby, the inertia member and the second coil spring configure a dynamic damper that damps vibration having a specific frequency by applying opposite phase vibration to the output plate.

Furthermore, there is known, as a damper device including a dynamic damper, a damper device that is provided with a drive plate, a driven plate that is coupled to a turbine, an intermediate member, a plurality of outer peripheral side torsion springs that elastically couple the drive plate and the intermediate member in a rotational direction, and a plurality of inner peripheral side torsion springs that elastically couple the intermediate member and the driven plate in a rotational direction (see, for example Patent Document 2). In this damper device, the dynamic damper is coupled to the intermediate member. In addition, this damper device includes a float member for making two outer peripheral side torsion springs in each set act in series. In Patent Document 2, it is also described that the dynamic damper is coupled to the float member for making two outer peripheral side torsion springs in each set act in a series-like manner, and the dynamic damper is coupled to a member for making two inner peripheral side torsion springs in each set act in a series-like manner.

RELATED ART DOCUMENT

Patent Document

Patent Document 1: Japanese Patent Application Publication No. 2009-293671 (JP 2009-293671 A)
Patent Document 2: Japanese Patent Application Publication No. 2014-152814 (JP 2014-152814 A)

SUMMARY

In a damper device including a dynamic damper described above, it is necessary to adequately set the entire stiffness (synthetic spring constant) of elastic bodies that transmit torque between an input element and an output element in consideration of an element to which the dynamic damper is coupled, so that the vibration damping effect of the dynamic damper can be further enhanced. In addition, in the damper device described above, there is a concern that the vibration that should be damped normally cannot be favorably damped by the dynamic damper because of the hysteresis of the elastic bodies for transmitting torque, that is, the friction force that acts on the elastic bodies when reducing load. Accordingly, it is also necessary to take the hysteresis into consideration when determining the stiffness of the elastic bodies for transmitting torque.

Therefore, a primary object of the present disclosure is, in a damper device including a dynamic damper, to further improve the vibration damping performance of the dynamic damper.

A damper device including: an input element; a first intermediate element; a second intermediate element; an output element; a plurality of first elastic bodies that transmits torque between the input element and the first intermediate element; a plurality of second elastic bodies that transmits torque between the first intermediate element and the second intermediate element; a plurality of third elastic bodies that acts in series with the second elastic bodies and transmits torque between the second intermediate element and the output element; and a dynamic damper that includes a mass body and vibration absorbing elastic bodies, wherein:

the dynamic damper is coupled to the first intermediate element;

the second and the third elastic bodies are straight coil springs disposed between the first intermediate element and the second intermediate element or between the second intermediate element and the output element so that outward movement of the second and the third elastic bodies in a radial direction of the damper device is restricted at respective both end portions; and a gap is formed between each body portion of the second and the third elastic bodies and each member disposed on an outer side of the second and the third elastic bodies in the radial direction.

In this damper device, the dynamic damper is coupled to the first intermediate element. In addition, the second elastic bodies that transmit torque between the first intermediate element and the second intermediate element and the third elastic bodies that transmit torque between the second intermediate element and the output element act in series with each other. Thereby, the stiffness of the elastic bodies that transmit torque between the first intermediate element and the output element, that is, the synthetic spring constant of the second and the third elastic bodies can be made smaller. Therefore, the first intermediate element is more likely to swing during the operation of the damper device, it is thereby possible to further improve the vibration damping efficiency of the dynamic damper. Furthermore, in this damper device, straight coil springs are adopted as the second and the third elastic bodies. The second and the third elastic bodies are disposed between the first intermediate element and the second intermediate element or between the second intermediate element and the output element so that outward movement of the second and the third elastic bodies in a radial direction of the damper device is restricted at respective both end portions. In addition, a gap is formed between each body portion of the second and the third elastic bodies and each member disposed on the outer side of the second and the third elastic bodies in the radial direction. Thereby, when the centrifugal force acts on the second and the third elastic bodies along with rotation of the first and the second intermediate elements and the output element, it is possible for each body portion of the second and the third elastic bodies not to be in slide-contact with each member disposed on the outer side of the second and the third elastic bodies in the radial direction as much as possible. As a result, the hysteresis of the second and the third elastic bodies is reduced, it is thereby possible to favorably prevent the vibration damping effect of the dynamic damper from being deteriorated due to the hysteresis. Accordingly, in this damper device, it is possible to extremely favorably improve the vibration damping performance of the dynamic damper.

DETAILED DESCRIPTION OF THE PREFERRED EMBODIMENTS

Hereinafter, modes for carrying out the present disclosure will be explained with reference to the drawings.

Figure 1:
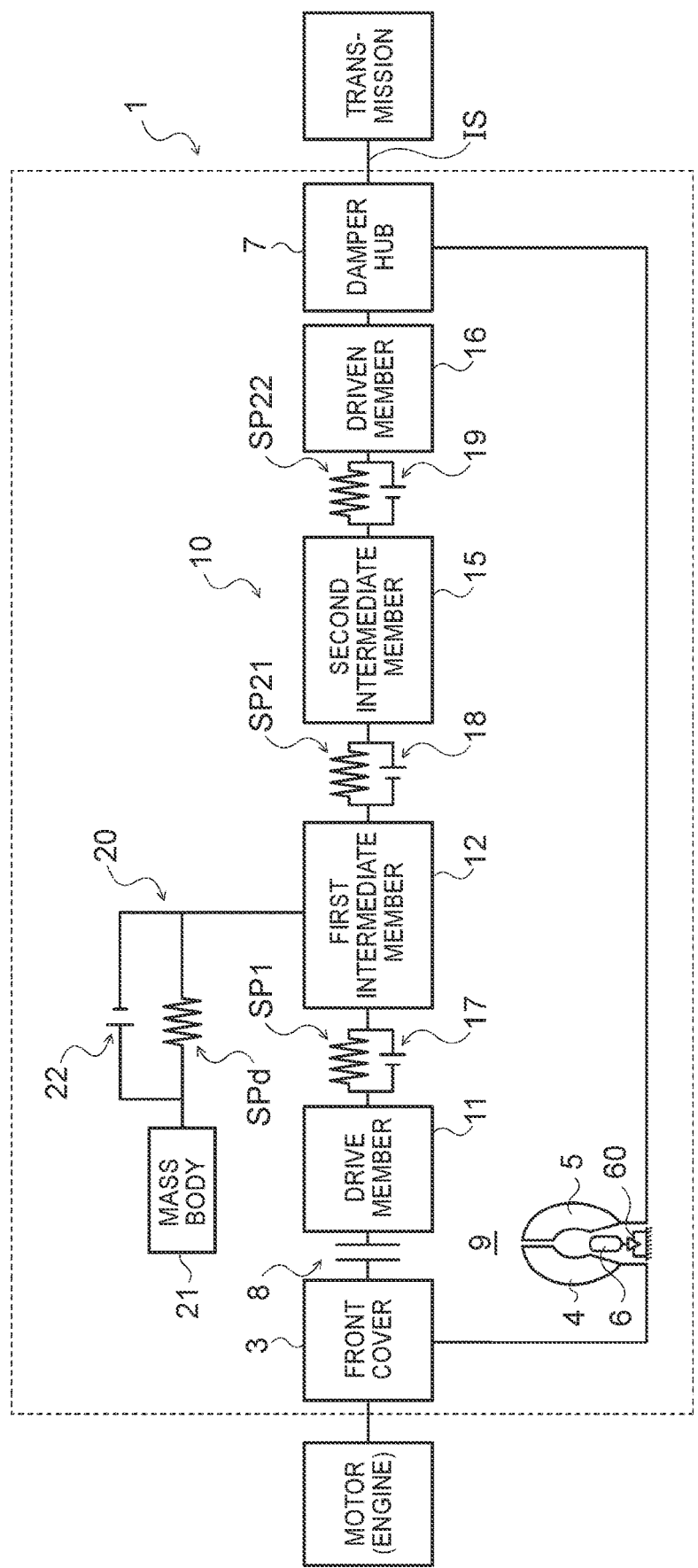
FIG. 1 is a schematic configuration view illustrating a starting device that includes a damper device according to an embodiment of the present disclosure.
Figure 2:
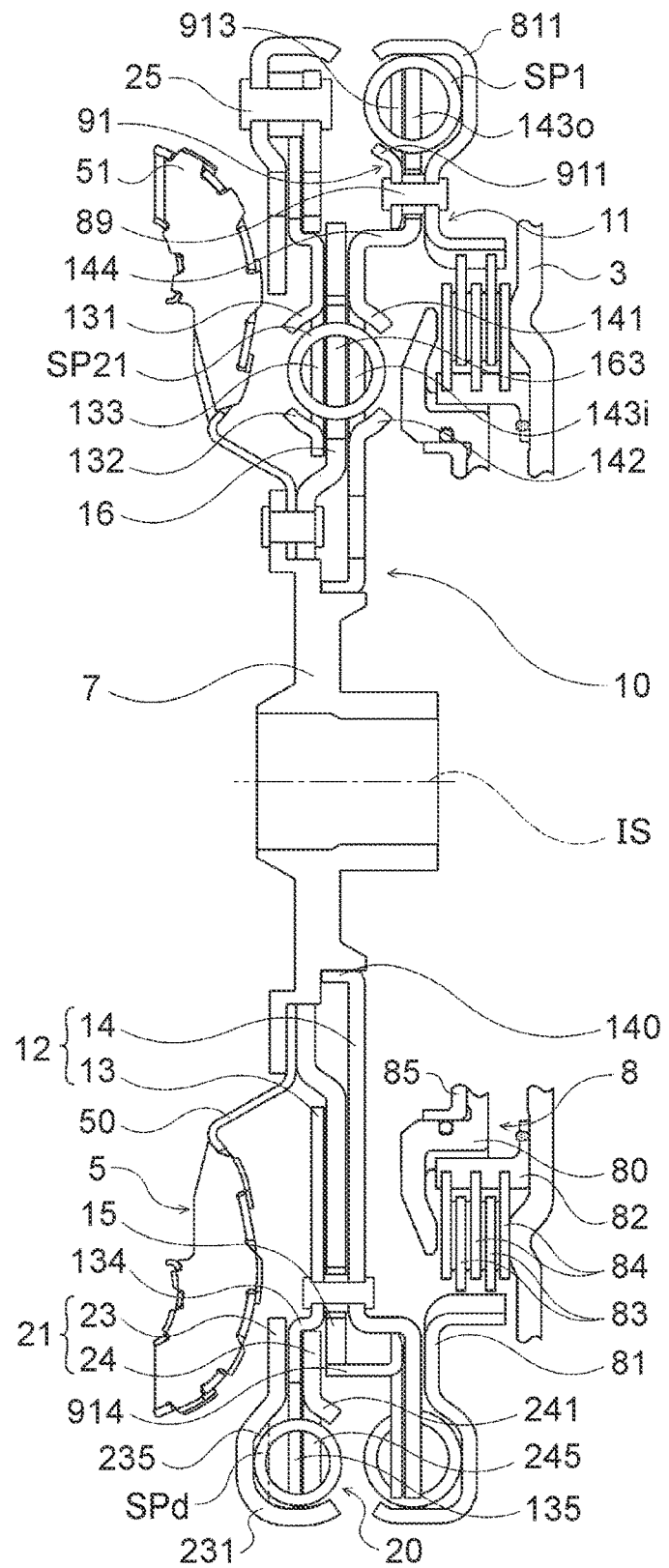
FIG. 2 is a cross-sectional view illustrating the damper device included in the starting device of FIG. 1.

FIG. 1 is a schematic configuration view illustrating a starting device 1 that includes a damper device 10 according to an embodiment of the present disclosure. FIG. 2 is a cross-sectional view illustrating the damper device 10. The starting device 1 illustrated in these drawings is installed in a vehicle (for example, front-wheel-drive vehicle) including an engine (internal combustion engine) as a motor and includes, in addition to the damper device 10, a front cover 3 as an input member that is coupled to a crank shaft (output shaft) of the engine, a pump impeller (input-side fluid transmission element) 4 that is fixed to the front cover 3, a turbine runner (output-side fluid transmission element) 5 that is coaxially rotatable with the pump impeller 4, a damper hub 7 as an output member that is coupled to the damper device 10 and is fixed to an input shaft IS of a transmission that is an automatic transmission (AT) or a continuously variable transmission (CVT), a lock-up clutch 8 that is a multi-plate hydraulic-typed clutch, a dynamic damper 20 that is coupled to the damper device 10, and the like.

The pump impeller 4 includes a pump shell, not shown in the drawings, that is closely fixed to the front cover 3 and a plurality of pump blades (omitted to be shown in the drawings) that is disposed on an inner surface of the pump shell. The turbine runner 5 includes, as illustrated in FIG. 2, a turbine shell 50 and a plurality of turbine blades 51 that is disposed on an inner surface of the turbine shell 50. In the present embodiment, an inner peripheral portion of the turbine shell 50 of the turbine runner 5 is fixed to the damper hub 7 via a plurality of rivets. The pump impeller 4 and the turbine runner 5 face each other, and are coaxially provided therebetween with a stator 6 (see FIG. 1) for rectifying a flow of operating oil (operating fluid) from the turbine runner 5 to the pump impeller 4. The stator 6 includes a plurality of stator blades, and the rotational direction of the stator 6 is set only to one direction by a one-way clutch 60. The pump impeller 4, the turbine runner 5, and the stator 6 form a torus (annular flow passage) that circulates the operating oil and functions as a torque converter (fluid transmission device) having a function for amplifying torque. However, in the starting device 1, the stator 6 and the one-way clutch 60 may be omitted, and the pump impeller 4 and the turbine runner 5 may be functioned as a fluid coupling.

The lock-up clutch 8 performs a lock-up of coupling the front cover 3 to the damper hub 7, that is, the input shaft IS of the transmission, via the damper device 10, and releases the lock-up. The lock-up clutch 8 includes a lock-up piston 80 that is supported so as to be movable in the axial direction by a center piece fixed to the front cover 3 and not shown in the drawings, a clutch drum 81, an annular clutch hub 82 that is fixed to the inner surface of the front cover 3 so as to face the lock-up piston 80, a plurality of first frictional engagement plates (plates including frictional members on both surfaces) 83 that is fitted with splines formed on an inner peripheral surface of the clutch drum 81, and a plurality of second frictional engagement plates 84 (separator plates) that is fitted with splines formed on an outer peripheral surface of the clutch hub 82.

Furthermore, the lock-up clutch 8 include an annular flange member (oil chamber defining member) 85 and a plurality of return springs (omitted to be shown in the drawings), the annular flange member 85 being attached to the center piece of the front cover 3 so as to be positioned on an opposite side of the lock-up piston 80 from the front cover 3, that is, so as to be positioned on the damper hub 7 and the damper device sides with respect to the lock-up piston 80, the return springs being disposed between the front cover 3 and the lock-up piston 80. The lock-up piston 80 and the flange member 85 define an engagement oil chamber, not shown in the drawings, and operating oil (engagement hydraulic pressure) is supplied from a hydraulic pressure control device, not shown in the drawings, to the engagement oil chamber. By increasing the engagement hydraulic pressure supplied to the engagement oil chamber, the lock-up piston 80 is moved in the axial direction so as to press the first and the second frictional engagement plates 83 and 84 toward the front cover 3, which makes it possible to engage (completely engage or slip-engage) the lock-up clutch 8.

The damper device 10, as illustrated in FIG. 1 and FIG. 2, includes as rotational elements, a drive member (input element) 11, a first intermediate member (intermediate element) 12, a second intermediate member (intermediate element) 15, and a driven member (output element) 16, and includes as torque transmitting elements (torque transmitting elastic bodies), a plurality (three, for example in the present embodiment) of outer-side springs (first elastic bodies) SP1 that is disposed close to an outer periphery of the damper device 10, a plurality of first inner-side springs (second elastic bodies) SP21 and a plurality of second inner-side springs (third elastic bodies) SP22 that are disposed on an inner side of the outer-side springs SP1, and each number of the first inner-side springs and the second inner-side springs are plural and the same (three for each, for example in the present embodiment).

In the present embodiment, arc coil springs are adopted as the outer-side springs SP1, the arc coil springs being made of a metal material and are wound so as to form an axial center that extends in an arc-shaped manner when no load is applied. Moreover, straight coil springs are adopted as the first and the second inner-side springs SP21 and SP22, the straight coil springs being made of a metal material and are wound in a spiral-shaped manner so as to form an axial center that extends straight when no load is applied. Furthermore, in the present embodiment, springs that include the same specifications (stiffness, that is, spring constant and the like) are adopted as the first and the second inner-side springs SP21 and SP22. However, the specifications of the first and the second inner-side springs SP21 and SP22 may be different from each other. Besides, so-called parent-springs may be adopted as the first and the second inner-side springs SP21 and SP22.

The drive member 11 is configured by the clutch drum (first member) 81 of the lock-up clutch 8 and an annular drive plate 91 coupled to the clutch drum 81 via the plurality of rivets (fastening tools) 89, and is disposed in a region on an outer peripheral side in a fluid transmitting chamber 9 that is defined by the front cover 3 and the pump shell of the pump impeller 4. The clutch drum 81 includes an annular spring support portion 811 and a plurality (three, for example in the present embodiment) of spring abutment portions (elastic body abutment portions), not shown in the drawings. The spring support portion 811 supports (guides), for each of the plurality of outer-side springs SP1, an outer peripheral portion, a side portion (side portion in the right side in FIG. 2) on a front cover 3 side (engine side), an inner peripheral side of the side portion, and an outer peripheral side (shoulder side) of a side portion on a turbine runner 5 side (transmission side). The plurality of spring abutment portions of the clutch drum 81 is disposed in the clutch drum 81 so as to be side by side in the circumferential direction at intervals corresponding to a natural length of each outer-side spring SP1.

The drive plate (second member) 91 includes a plurality (three, for example in the present embodiment) of spring support portions 911 that is disposed side by side at intervals in the circumferential direction and a plurality (three, for example in the present embodiment) of spring abutment portions (elastic body abutment portions) 913. The plurality of spring support portions 911 each supports (guides) the side portion of the corresponding outer-side spring SP1 on the turbine runner 5 side from an inner peripheral side. The plurality of spring abutment portions (elastic body portions) 913 is disposed in the drive plate 91 so as to be side by side in the circumferential direction at intervals corresponding to the natural length of each outer-side spring SP1.

When the clutch drum 81 and the drive plate 91 are coupled to each other, the plurality of outer-side springs SP1 are supported by the spring support portion 811 and the spring support portion 911 of the drive plate 91 at intervals in the circumferential direction, and is disposed in a region on an outer peripheral side of the fluid transmitting chamber 9 so as to be close to the outer periphery of the damper device 10. That is, the drive member 11 supports, on a radially outer side with respect to the plurality of rivets 89 for fastening the clutch drum 81 and the drive plate 91, the plurality of outer-side springs SP1 from the outer side of the damper device 10 in a radial direction, the inner side in the radial direction, and one side of the damper device 10 in the axial direction (the right side of FIG. 2, that is, the front cover 3 side). Each of the spring abutment portions of the clutch drum 81, in a state in which the damper device 10 is attached (a state in which the damper device 10 is not operated after the completion of attachment), abuts, between the outer-side springs SP1 that are adjacent to each other, against each end portion of the adjacent outer-side springs SP1. In the same manner, each of the spring abutment portions 913 of the drive plate 91, in a state in which the damper device 10 is attached, also abuts, between the outer-side springs SP1 that are adjacent to each other, against each end portion of the adjacent outer-side springs SP1.

The first intermediate member 12 includes an annular first plate member 13 that is disposed on the turbine runner 5 side, and an annular second plate member 14 that is disposed on the front cover 3 side so as to be rotatably supported by the damper hub 7 and is coupled (fixed) to the first plate member 13 via a plurality of rivets. The first plate member 13 configuring the first intermediate member 12 includes a plurality (three, for example in the present embodiment) of spring support portions 131 that is disposed side by side at intervals (at equal intervals) in the circumferential direction, a plurality (three, for example in the present embodiment) of spring support portions 132 that is disposed side by side at intervals in the circumferential direction and each faces the corresponding spring support portion 131 in a radial direction of the first plate member 13, and a plurality (three, for example in the present embodiment) of inner-side spring abutment portions (elastic body abutment portions) 133. Each of the plurality of spring support portions 131 supports (guides) each side portion of the corresponding first and second inner-side springs SP21 and SP22 (one of each) on the turbine runner 5 side from an outer peripheral side. Each of the plurality of spring support portions 132 supports (guides) each side portion of the corresponding first and second inner-side springs SP21 and SP22 (one of each) on the turbine runner 5 side from an inner peripheral side. The plurality of inner-side spring abutment portions 133 is provided one by one between the spring support portions 131 and 132 that are adjacent to each other along the circumferential direction.

The second plate member 14 configuring the first intermediate member 12 includes a supported portion 140 having a short tubular shape that is formed by bending an inner peripheral portion thereof so as to extend toward the turbine runner 5 in the axial direction, a plurality (three in the present disclosure) of spring support portions 141 that is disposed side by side at intervals (at equal intervals) in the circumferential direction, a plurality (three in the present embodiment) of spring support portions 142 that is disposed side by side at intervals (at equal intervals) in the circumferential direction and each faces the corresponding spring support portion 141 in a radial direction of the second plate member 14, a plurality (three, for example in the present embodiment) of inner-side spring abutment portions (elastic body abutment portions) 143*i*, a plurality (six, for example in the present embodiment) of first outer-side spring abutment portions (elastic body abutment portions) 143*o*, and a short tubular portion 144 that extends in the axial direction between the inner-side spring abutment portions 143*i* and the first outer-side spring abutment portions 143*o* in a radial direction.

An inner peripheral surface of the supported portion 140 of the second plate member 14 is supported by the damper hub 7, a tip end surface of the supported portion 140 abuts against the damper hub 7 so that movement of the second plate member 14 in the axial direction is restricted. Each of the plurality of spring support portions 141 supports (guides) each side portion of the corresponding first and second inner-side springs SP21 and SP22 (one of each) on the front cover 3 side from the outer peripheral side. Each of the plurality of spring support portions 142 supports (guides) each side portion of the corresponding first and second inner-side springs SP21 and SP22 (one of each) on the front cover 3 side from the inner peripheral side.

The plurality of inner-side spring abutment portions 143*i* is provided one by one between the spring support portions 141 and 142 that are adjacent to each other along the circumferential direction. The plurality of the first outer-side spring abutment portions 143*o* is disposed on the radially outer side of the plurality of inner-side spring abutment portions 143*i* and the front cover 3 side in such a manner that two of the first outer-side spring abutment portions 143*o* make a pair and are disposed so as to be side by side at intervals in the circumferential direction. Two of the first outer-side spring abutment portions 143*o* that make a pair face each other at intervals corresponding to the natural length of each outer-side spring SP1. The tubular portion 144 (outer peripheral surface thereof) supports an inner peripheral surface of the drive plate 91 that configures the drive member 11. Thereby, it is possible to rotatably support (align) the drive member 11 by the second plate member 14 (first intermediate member 12) that is supported by the damper hub 7.

Figure 3:
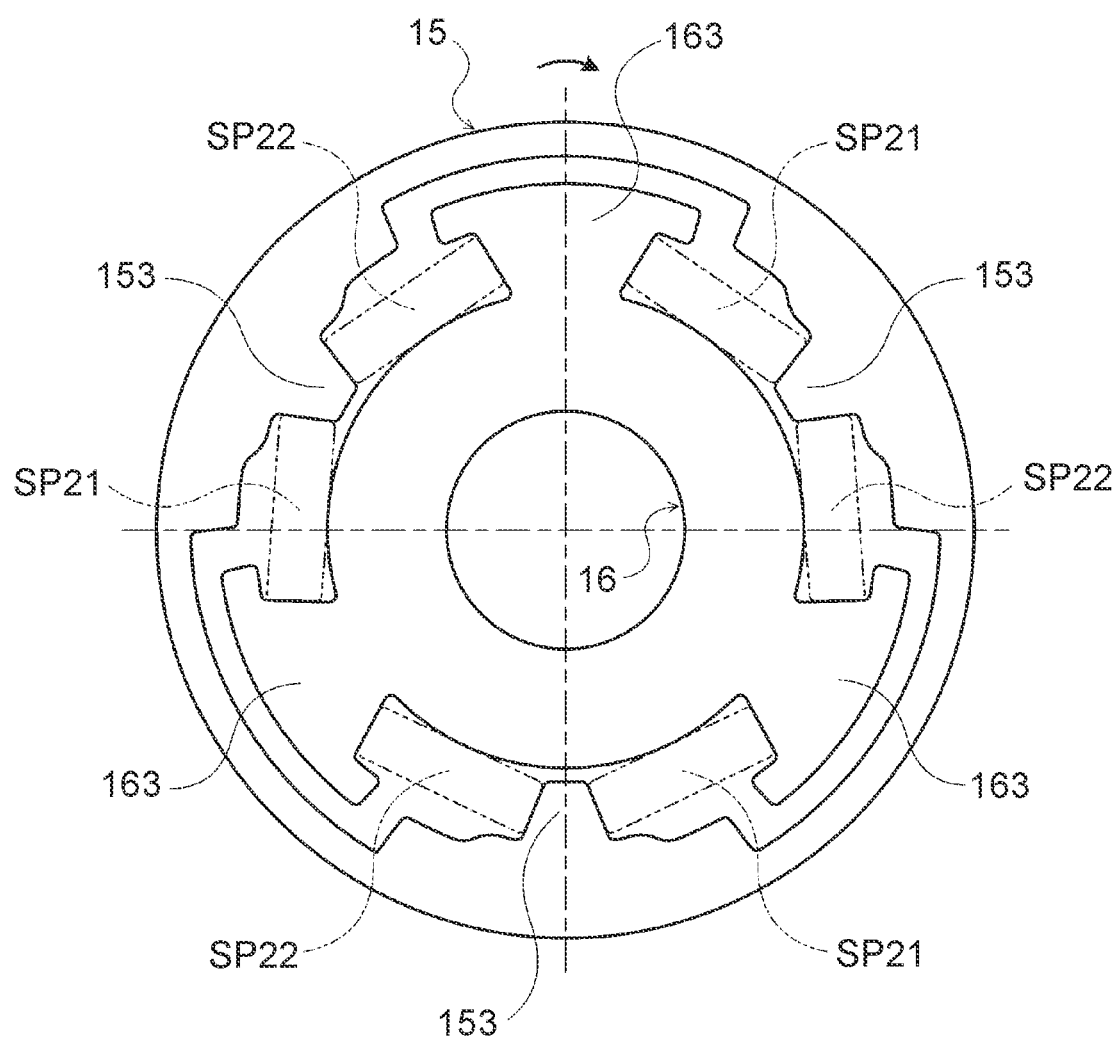
FIG. 3 is a front view illustrating a second intermediate element and an output element included in the damper device of FIG. 2.

The second intermediate member 15, as illustrated in FIG. 3, is configured as a plate-like annular member that surrounds the driven member 16, and includes a plurality (three, for example in the present embodiment) of spring abutment portions (intermediate-side abutment portions) 153 each projecting from an inner peripheral surface of the second intermediate member 15 toward radially inner side, that is, toward the center of the second intermediate member 15 (axial center of the damper device 10), and each being disposed so as to be side by side at intervals (equal intervals) in the circumferential direction. The second intermediate member 15 is disposed between the first plate member 13 and the second plate member 14 in the axial direction of the damper device 10 (see FIG. 2), and is rotatably supported (aligned) by the drive plate 91 that configures the drive plate 11. That is, the drive plate 91 includes a plurality of plate support portions 914 disposed so as to be side by side at intervals in the circumferential direction and configured so as to extend toward the turbine runner 5 in the axial direction, and the outer peripheral surface of the second intermediate member 15 is supported by each of the plate support portions 914.

When the first and the second plate members 13 and 14 are coupled to each other, each spring support portion 131 of the first plate member 13 faces the corresponding spring support portion 141 of the second plate member 14, and each spring support portion 132 of the first plate member 13 faces the corresponding spring support portion 142 of the second plate member 14. The first inner-side springs SP21 and the second inner-side springs SP22 are supported by the first and the second plate members 13 and 14 that configure the first intermediate member 12, and are alternately disposed at intervals in the circumferential direction on the inner side of the plurality of outer-side springs SP1 so as to be closer to the turbine runner 5 than the plurality of outer-side springs SP1 (partially overlap with the turbine runner 5 as seen from the radial direction).

In a state in which the damper device 10 is attached, each inner-side spring abutment portion 133 of the first plate member 13 of the first intermediate member 12 and each inner-side spring abutment portion 143*i* of the second plate member 14 abut, between the first and the second inner-side springs SP21 and SP22 that are supported by the spring support portions 131, 132, 141, and 142 that are different from each other, against each end portion of the first the second inner-side springs SP21 and SP22. Moreover, each spring abutment portion 153 of the second intermediate member 15 abuts, between the first and the second inner-side springs SP21 and SP22 that are supported by the same spring support portions 131, 132, 141, and 142 and make pairs with each other, against each end portion (end surface) of the first the second inner-side springs SP21 and SP22.

That is, in a state in which the damper device 10 is attached, one end surface of each inner-side spring SP21 abuts against the corresponding inner-side spring abutment portions 133 and 143*i* of the first intermediate member 12, and the other end (end surface) of each inner-side spring SP21, as illustrated in FIG. 3, abuts against the corresponding spring abutment portion 153 of the second intermediate member 15. Moreover, in a state in which the damper device 10 is attached, one end (end surface) of each second inner-side spring SP22, as illustrated in FIG. 3, abuts against the corresponding spring abutment portion 153 of the second intermediate member 15, and the other end of each second inner-side spring SP22 abuts against the corresponding inner-side spring abutment portions 133 and 143*i* of the first intermediate member 12.

Furthermore, each first outer-side spring abutment portion 143*o* of the second plate member 14 of the first intermediate member 12, as illustrated in FIG. 2, is closer to the front cover 3 than the plurality of inner-side spring abutment portions 143*i* and abuts against an end portion of the corresponding outer-side spring SP1 in a state in which the damper device 10 is attached. That is, in a state in which the damper device is attached, both end portions of each outer-side spring SP1 abut against the corresponding one of two first outer-side spring abutment portions 143*o* of the second plate member 14 that makes a pair with each other.

The driven member 16, as illustrated in FIG. 2, is disposed between the first plate member 13 and the second plate member 14 of the first intermediate member 12 and is fixed to the damper hub 7 via a plurality of rivets. The driven member 16, as illustrated in FIG. 3, includes a plurality (three, for example in the present embodiment) of spring abutment portions (output-side abutment portions) 163 each being formed at intervals (equal intervals) in the circumferential direction so as to project toward outer side in the radial direction of the damper device 10 (driven member 16). In a state in which the damper device 10 is attached, each spring abutment portion 163 of the driven member 16 abuts, between the first and the second inner-side springs SP21 and SP22 being supported by the spring support portions 131, 132, 141, and 142 that are different from each other, against each end portion of the first and the second inner-side springs SP21 and SP22. Thereby, in a state in which the damper device 10 is attached, the other end of each second inner-side spring SP22 abuts against the corresponding spring abutment portion 163 of the driven member 16 (see FIG. 3). Moreover, in a state in which the damper device 10 is attached, the one end of each first inner-side spring SP21 abuts against the corresponding spring abutment portion 163 of the driven member 16 (see FIG. 3).

As a result, the driven member 16 is coupled to the drive member 11 via the plurality of outer-side springs SP1, the first intermediate member 12, the plurality of first inner-side springs SP21, the second intermediate member 15, and the plurality of second inner-side springs SP22. In addition, the first and the second inner-side springs SP21 and SP22 that are paired with each other are coupled in series via the spring abutment portions 153 of the second intermediate member 15 between the first intermediate member 12 and the driven member 16. Thereby, the stiffness of the elastic bodies that are disposed on the inner side of the first outer-side springs SP1 in the radial direction of the damper device 10 and transmit torque between the first intermediate member 12 and the driven member 16, that is, the synthetic spring constant of the first and the second inner-side springs SP21 and SP22 can be made smaller.

Figure 4:
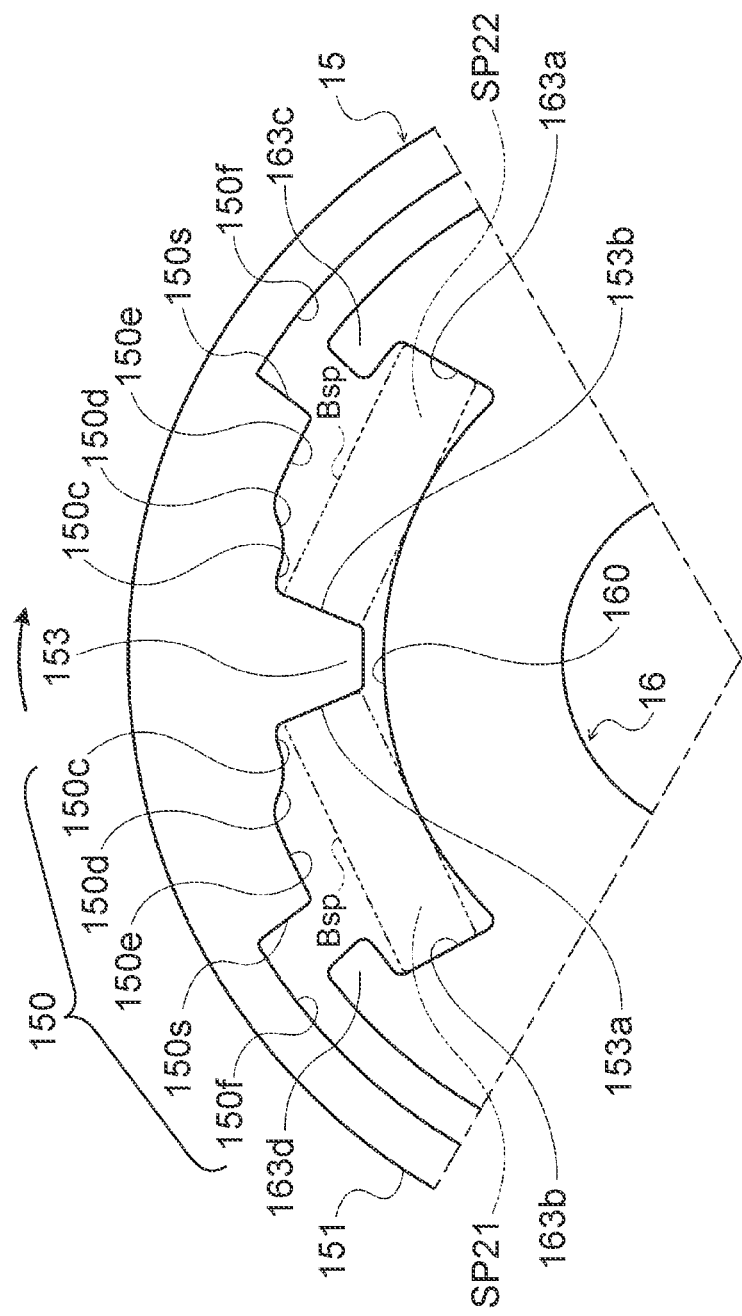
FIG. 4 is an enlarged view illustrating the second intermediate element and the output element included in the damper device of FIG. 2.

FIG. 4 is an enlarged view illustrating the second intermediate member and the driven member 16 of the damper device 10. As illustrated in the same figure, each spring abutment portion 153 of the second intermediate member 15 includes a first abutment surface 153a that abuts against an end surface of the other end of each first inner-side spring SP21 and a second abutment surface 153b that abuts against an end surface of the one end of each second inner-side spring SP22. In addition, an inner peripheral surface 150 of the second intermediate member 15 that surrounds the driven member 16 includes a plurality (six, for example in the present embodiment) of radial support surfaces 150c and a plurality (six, for example in the present embodiment) of flank surfaces 150e.

The plurality of radial support surfaces 150c is formed on both sides of each spring abutment portion 153 in the circumferential direction of the damper device (second intermediate member 15) so that two of them make a pair. Each of the radial support surfaces 150c extends from each base end of the first or the second abutment surfaces 153a and 153b, so as to be away from each spring abutment portion 153 along the circumferential direction. In addition, in a state in which the damper device 10 is attached, a slight gap is formed between each radial support surface 150c and each end portion of the corresponding first or the second inner-side springs SP21 and SP22. When the centrifugal force acts on the first and the second inner-side springs SP21 and SP22 along with rotation of the second intermediate member 15 and the driven member 16, each radial support surface 150c abuts against an outer peripheral surface of each end portion of the corresponding first and the second inner-side springs SP21 and SP22, and supports the first and the second inner-side springs SP21 and SP22 from radially outer side. However, each radial support surface 150c, in a state in which the damper device is attached, may be formed so as to abut from the radially outer side against a range corresponding to, for example, a length of a coil for one turn to a couple of turns from the each end surface of the first and the second inner-side springs SP21 and SP22.

The plurality of flank surfaces 150e is formed on both sides of a pair of the radial support surfaces 150c in the circumferential direction of the damper device 10 (second intermediate member 15) so that two of the flank surfaces 153e make a pair. That is, each of the flank surfaces 150e is positioned on the outer side of the corresponding radial support surface 150c in the radial direction of the damper device 10 (second intermediate member 15), and is formed so as to be further away from the spring abutment portion 153 than the radial support surface 150c in the circumferential direction. Besides, a bent surface 150d that bridges each radial support surface 150c and each flank surface 150e and is, for example, convex from radially outer side toward the inner side is formed between each radial support surface 150c and each flank surface 150e. Thereby, in a state in which the damper device 10 is attached, a gap is formed between each flank surface 150e (inner peripheral surface 150) and each body portion Bsp of the first and the second inner-side springs SP21 and SP22 including a central portion in the axial direction.

Furthermore, the inner peripheral surface 150 of the second intermediate member 15 includes a plurality (six, for example in the present embodiment) of stopper surfaces 150s and a plurality (three, for example in the present embodiment) of facing surfaces 150f that is each formed between the stopper surfaces 150s that are adjacent to each other in the circumferential direction. Each of the stopper surfaces 150s extends from an end portion on an opposite side of each flank surface 150e from the radially support surface 150c toward the outer peripheral surface 151 of the second intermediate member 15. Each of the facing surfaces 150f extends in the circumferential direction between each end portion of the stopper surfaces 150s that are adjacent to each other in the circumferential direction, the end portion being close to the outer peripheral surface 151. Each facing surface 150f faces an outer peripheral surface of the corresponding spring abutment portion 163 of the driven member 16 at intervals in the radial direction of the damper device 10.

Each of the spring abutment portions 163 of the driven member 16 includes a first abutment portion 163a that abuts against the end surface of the other end of each second inner spring SP22 and a second abutment portion 163b that abuts against the end surface of the one end of each first inner-spring SP21. Each spring abutment portion 163 also includes a first radial support portion 163c that projects in the circumferential direction on the outer side of the first abutment portion 163a in the radial direction of the damper device 10 (driven member 16), and a second radial support portion 163d that projects in the circumferential direction and toward an opposite side of the first radial support portion 163c on the outer side of the second abutment portion 163b in the radial direction of the damper device 10 (driven member 16).

As illustrated in FIG. 4, in a state in which the damper device 10 is attached, a slight gap is formed between an inner peripheral surface of the first radial support portion 163c of each spring abutment portion 163 and an end portion of the corresponding second inner-side spring SP22. When the centrifugal force acts on the second inner-side springs SP22 along with rotation of the second intermediate member 15 and the driven member 16, each first radial support portion 163c abuts against an outer peripheral surface of the end portion of the corresponding second inner-side spring SP22, and supports the inner-side spring SP22 from the radially outer side. However, each first radial support portion 163c, in a state in which the damper device is attached, may be formed so as to abut from the radially outer side against a range corresponding to a length of a coil for one turn to a couple of turns from the end surface of each second inner-side spring SP22. Furthermore, in a state in which the damper device 10 is attached, each first radial support portion 163c faces the corresponding stopper face 150s of the second intermediate member 15 at intervals in the circumferential direction.

In a state in which the damper device 10 is attached, a slight gap is formed between an inner peripheral surface of the second radial support portion 163d of each spring abutment portion 163 and an end portion of the corresponding first inner spring SP21. When the centrifugal force acts on the first inner-side spring SP21 along with rotation of the second intermediate member 15 and the driven member 16, each second radial support portion 163d abuts against an end portion of the corresponding first inner-side spring SP21 and supports the first inner-side spring SP21 from radially outer side. However, each second radial support portion 163d, in a state in which the damper device is attached, may also be formed so as to abut from the radially outer side against a range corresponding to a length of a coil for one turn to a couple of turns from the end surface of the each first inner-side spring SP21. Moreover, in a case to which the damper device 10 is attached, each second radial support portion 163d faces the corresponding stopper surface 150s of the second intermediate member 15 at intervals in the circumferential direction.

As illustrated in FIG. 1, the damper device 10 includes, as a rotation restriction stopper for restricting relative rotation between the drive member 11 and the driven member 16, a stopper 17 interposed between first elements that restricts relative rotation between the drive member 11 and the first intermediate member 12, a stopper 18 interposed between second elements that restricts relative rotation between the first intermediate member 12 and the second intermediate member 15, and a stopper 19 interposed between third elements that restricts relative rotation between the second intermediate member 15 and the driven member 16.

In the present embodiment, the stopper 17 interposed between first elements is configured by collars attached to the plurality of rivets for coupling the clutch drum 81 and the drive plate 91 that configure the drive member 11, and a plurality of, for example, arc-shaped opening portions that are formed on the second plate member 14 of the first intermediate member 12. In a state in which the damper device 10 is attached, the rivets and the collars for coupling the clutch drum 81 and the drive plate 91 are each disposed in the corresponding opening portion of the second plate member 14 so as not to abut against inner wall surfaces on both sides that define the opening portion. When each collar abuts against one of the inner wall surfaces of the corresponding opening portion in accordance with relative rotation between the drive member 11 and the intermediate member 12, relative rotation between the drive member 11 and the first intermediate member 12 and torsion of each outer-side spring SP1 are restricted.

The stopper 18 interposed between the second elements is configured by collars attached to the plurality of rivets for coupling the first and the second plate members 13 and 14 that configure the first intermediate member 12, and a plurality of notch portions (opening portions) that is formed in the second intermediate member 15 and, for example, extends in an arc-shaped manner. In a state in which the damper device 10 is attached, the rivets and the collars for coupling the first and the second plate members 13 and 14 are disposed in the corresponding notch portion of the second intermediate member 15 so as not to abut against wall surfaces on both sides that define the notch portion. When each collar abuts against one of the wall surfaces of the corresponding notch portion in accordance with relative rotation between the first and the second intermediate members 12 and 15, relative rotation between the first and the second intermediate members 12 and 15 and torsion of each inner-side spring SP21 are restricted.

The stopper 19 interposed between the third elements is configured by the plurality of stopper surfaces 150s that is formed in the second intermediate member and the first and second radial support portions 163c and 163d that are formed on the spring abutment portions 163 of the driven member 16. In a state in which the damper device 10 is attached, a gap is formed as described above between each stopper surface 150s of the second intermediate member 15 and the corresponding first or second radial support portion 163c or 163d of the driven member 16. When each stopper surface 150s of the second intermediate member 15 abuts against the corresponding first or second radial support portion 163c or 163d of the driven member 16 in accordance with relative rotation between the second intermediate member 15 and the driven member 16, relative rotation between the second intermediate member 15 and the driven member 16 and torsion of each second inner-side spring SP22 are restricted.

Accordingly, relative rotation between the drive member 11 and the first intermediate member 12 and torsion of each of the first outer-side springs SP1 are restricted by the stopper 17 interposed between the first elements, relative rotation between the first and the second intermediate members 12 and 15 and torsion of each of the first inner-side springs SP21 are restricted by the stopper 18 interposed between the second elements, and relative rotation between the second intermediate member 15 and the driven member 16 and torsion of each of the second inner-side springs SP22 are restricted by the stopper 19 interposed between the third elements, thereby relative rotation between the drive member 11 and the driven member 16 is restricted. In the present embodiment, the stopper 17 interposed between the first elements (specifications of the drive member 11, the first intermediate member 12, and the outer-side springs SP1), the stopper 18 interposed between the second elements (specifications of the first intermediate member 12, the second intermediate member 15, and the first inner-side springs SP21), and the stopper 19 interposed between the third elements (specifications of the second intermediate member 15, the driven member 16, and the second inner-side springs SP22) are configured (set) so that relative rotation between the first and the second intermediate members 12 and 15 and relative rotation between the second intermediate member 15 and the driven member 16 are restricted simultaneously by the stopper 18 interposed between the second elements and the stoppers 19 interposed between the third elements before relative rotation between the drive member 11 and the first intermediate member 12 is restricted by the stopper 17 interposed between the first elements.

A dynamic damper 20 includes an annular mass body 21 and a plurality (three, for example in the present embodiment) of vibration absorbing springs (vibration absorbing elastic bodies) SPd that are straight coil springs or arc coil springs being disposed between the mass body 21 and the first intermediate member 12 that is a first rotation element of the damper device 10. Here, "dynamic damper" is a mechanism for damping the vibration by applying to a vibrating body the opposite phase vibration having a frequency (engine rotational speed) that corresponds to a resonance frequency of the vibrating body, and is configured by coupling springs (elastic bodes) and a mass body with respect to the vibrating body (the vibrating body is the first intermediate member 12 in the present embodiment) so as not to be included in a torque transmitting path. That is, by adjusting the stiffness of the vibration absorbing springs SPd and the weight of the mass body 21, it is possible to damp the vibration having the desired frequency by the dynamic damper 20.

The mass body 21 of the dynamic damper 20, as illustrated in FIG. 2, includes an annular first weight body 23, an annular second weight body 24, and a plurality of rivets 25 that are fastening members for coupling the first and the second weight bodies 23 and 24. The first weight body 23 includes a plurality (three, for example in the present embodiment) of first spring support portions 231 that are disposed side by side at intervals (equal intervals) in the circumferential direction and a plurality (three, for example in the present embodiment) of first spring abutment portions 235 (elastic body abutment portions). The plurality of first spring support portions 231 each supports (guides), for the corresponding vibration absorbing spring SPd, an outer periphery portion, a side portion (a side portion on the left side of FIG. 2) on the turbine runner 5 side (transmission side), and an outer periphery side of a side portion on the front cover 3 side (engine side). The plurality of first spring abutment portions 235 is formed one by one between the first spring support portions 231 that are adjacent to each other, and two of the first spring abutment portions 235 that are adjacent to each other face each other at intervals corresponding to a natural length of each vibration absorbing spring SPd in the circumferential direction of the first weight body 23.

The second weight body 24 is configured as an annular and flat-like plate body having a slightly smaller outside diameter and a slightly larger inside diameter than those of the first weight body 23, and includes a plurality (three, for example in the present embodiment) of second spring support portions 241 that are disposed side by side at intervals in the circumferential direction and a plurality (three, for example in the present embodiment) of second spring abutment portions 245. The plurality of second spring support portions 241 each supports (guides) a side portion of the corresponding vibration absorbing spring SPd on the front cover 3 side. The plurality of the second spring abutment portions 245 is formed one by one between the second spring support portions 241 that are adjacent to each other, and two of the second spring abutment portions 245 that are adjacent to each other face each other at intervals corresponding to a natural length of each vibration absorbing spring SPd in the circumferential direction of the second weight body 24.

In the present embodiment, the plurality of first spring support portions 231 is formed so as to overhang in the axial direction toward the turbine runner 5 with respect to a flat-like part that includes the first spring abutment portions 235, and a part that includes the first spring abutment portions 235 (part other than the first spring support portions 231) takes a flat-like plate shape. The rivets 25 for coupling the first and the second weight bodies 23 and 24 are inserted into the first and the second spring abutment portions 235 and 245, and the first and the second spring support portions 231 and 241 face each other and are disposed side by side with the rivets 25 in the circumferential direction. In the present embodiment, the plurality (three, for example in the present embodiment) of rivets 25 is inserted so as to be positioned on the same concentric circle with respect to a pair of the first and the second spring abutment portions 235 and 245 that face each other.

The first plate member 13 of the first intermediate member 12 that is an object to which the dynamic damper 20 is coupled includes a short tubular portion 134 that extends in the axial direction on a radially outer side of the plurality of inner-side spring abutment portions 133 and a plurality (six, for example in the present embodiment) of outer-side spring abutment portions (elastic body abutment portions) 135 that is disposed so as to be side by side at intervals in the circumferential direction on the radially outer side of the cylinder portions 134. The plurality of outer-side spring abutment portions 135 is formed at equal intervals so that two of them (pair) make a pair (two of them are close to each other) on the radially outer side of the plurality of inner-side spring abutment portions 133 and on the turbine runner 5 side. Two of the outer-side spring abutment portions 135 that make a pair face each other at intervals corresponding to a natural length of each vibration absorbing spring SPd.

As illustrated in FIG. 2, an inner peripheral surface of the second weight body 24 that configures the mass body 21 of the dynamic damper 20 is rotatably supported by the tubular portion 134 of the first plate member 13 of the first intermediate member 12. Moreover, the plurality of vibration absorbing springs SPd that configures the dynamic damper 20 is supported by the first spring support portions 231 of the first weight body 23 and the second spring support portions 241 of the second weight body 24 that face each other so as to be side by side at intervals (at equal intervals) in the circumferential direction between the first and the second weight bodies 23 and 24. Furthermore, the plurality of rivets 25 for coupling the first and the second weight bodies 23 and 24 is disposed between the vibration absorbing springs SPd that are adjacent to each other (the first spring support portions 231 and 241) so as to be side by side with the vibration absorbing springs SPd in the circumferential direction.

Thereby, the mass body 21 and the plurality of vibration absorbing springs SPd of the dynamic damper 20 are disposed in a region on an outer peripheral side in a fluid transmitting chamber 9 so as to be close to the outer periphery of the damper device 10 between the outer peripheral portion of the turbine runner 5 and the outer-side springs SP1 of the damper device 10, and each vibration absorbing spring SPd overlaps the outer-side springs SP1 as seen from the axial direction of the damper device 10. As a result, a region in the vicinity of the outer peripheral portion of the turbine runner 5 that tends to be a dead space can be effectively utilized as a space for disposing the dynamic damper 20, that is, the mass body 21 and the vibration absorbing springs SPd, which makes it possible to improve the space efficiency of a whole device. In addition, by disposing the vibration absorbing springs SPd of the dynamic damper 20 at intervals in the circumferential direction between the first and second weight bodies 23 and 24 that configure the mass body 21, the mass body 21 and the vibration absorbing springs SPd can be disposed closer to each other so that a space occupied by the dynamic damper 20 can be reduced.

Furthermore, by disposing the mass body 21 close to the outer periphery of the damper device 10, the inertia of the mass body 21 is further increased so that the damping performance of the dynamic damper 20 can be further improved. In addition, by disposing the rivets 25 between the vibration absorbing springs SPd that are adjacent to each other so as to be side by side with the vibration absorbing springs SPd in the circumferential direction, the stiffness can be easily reduced by enlarging the diameter of the vibration absorbing springs SPd (diameter of coil) and the inertia of the mass body 21 including the rivets 25 can be increased as compared to a case in which, for example, the rivets 25 are disposed on the radially inner side of the vibration absorbing springs SPd. In the present embodiment, the first weight body 23 that configures the mass body 12 has an inside diameter smaller than that of the second weight body 24, an inner peripheral portion of the first weight body 23 is thereby positioned on the radially inner side of an inner peripheral portion of the second weight body 24 between the turbine runner 5 and the first plate member 13 of the first intermediate member 12. Thereby, the weight of the mass body 21 can be further increased.

Each outer-side spring abutment portion 135 of the first plate member 13 of the first intermediate member 12, in a state in which the damper device 10 is attached, extends in the radial direction of the damper device 10 to abut against an end portion of the corresponding vibration absorbing spring SPd in the vicinity of a central portion of the end portion. That is, in a state in which the damper device 10 is attached, both end portions of each vibration absorbing spring SPd abut against the corresponding one of two outer-side spring abutment portions 135 of the first plate member 13 that makes a pair to each other. Moreover, each first spring abutment portion 235 of the first weight body 23 that configures the mass body 21, in a state in which the damper device 10 is attached, extends in the radial direction of the damper device 10 on the turbine runner 5 side with respect to the outer-side spring abutment portions 135 to abut against an end portion of the corresponding vibration absorbing spring SPd. Furthermore, each second spring abutment portion 245 of the second weight body 24 that configures the mass body 21, in a state in which the damper device 10 is attached, extends in the radial direction of the damper device 10 on the front cover 3 side with respect to the outer-side spring abutment portions 135 to abut against an end portion of the corresponding vibration absorbing spring SPd. That is, in a state in which the damper device 10 is attached, both end portions of each vibration absorbing spring SPd also abut against the corresponding one of two first spring abutment portions 235 and 245 of the mass body 21 that makes a pair to each other.

Thereby, the mass body 21 and the vibration absorbing springs SPd, that is, the dynamic damper 20, are coupled to the first intermediate member 12 of the damper device 10. In the dynamic damper 20, as illustrated in FIG. 2, it is possible to press a part in the vicinity of the canter of the end portion of each vibration absorbing spring SPd by each outer-side spring abutment portion 135 of the first plate member 13, and to substantially press the part in the vicinity of the center of the end portion of each vibration absorbing spring SPd by each first spring abutment portion 235 of the first weight body 23 and each second spring abutment portion 245 of the second weight body 24 that face each other through the outer-spring abutment portion 135. Therefore, each vibration absorbing spring SPd can be more properly expanded and contracted along the axial center, which make it possible to reduce the hysteresis, that is, the friction force that acts on the vibration absorbing springs SPd when reducing load.

The dynamic damper 20 is also provided with a stopper 22 interposed between fourth elements that restricts relative rotation between the first plate 13 of the first intermediate member 12 and the mass body 21. The stopper 22 interposed between the fourth elements is configured by the plurality of rivets 25 that are fastening members for coupling the first and the second weight bodies 23 and 24 and the outer-side spring abutment portions 135 of the first plate member 13. That is, the plurality of rivets 25 inserted through a pair of the first and the second spring abutment portion 235 and 245 that face each other, in a state in which the damper device 10 is attached, are arranged between two outer-side spring abutment portions 135 that are adjacent to each other by bypassing the vibration absorbing springs SPd so as not to abut against both of the adjacent outer-side spring abutment portions 135. When each outer-side spring abutment portion 135 abuts against the corresponding rivet 25 in accordance with relative rotation between the first plate member 13 and the mass body 21, relative rotation between the first plate member 13 (first intermediate member 12) and the mass body 21 and torsion of each vibration absorbing spring SPd are restricted. In the present embodiment, the stopper 22 interposed between the fourth elements (specifications of the first intermediate member 12, the vibration absorbing springs SPd, and the mass body 21) is configured (set) so that relative rotation between the first plate member 13 (first intermediate member 12) and the mass body 21 is restricted before each vibration absorbing spring SPd is completely contracted.

Next, the operation of a starting device 1 that is configured as mentioned above will be explained.

When the lock-up is released by the lock-up clutch 8 of the starting device 1, as can be understood from FIG. 1, torque (power) transmitted from the engine as the motor to the front cover 3 is transmitted to the input shaft IS of the transmission through a path, that is, the pump impeller 4, the turbine runner 5, and the damper hub 7. On the contrary, when the lock-up is performed by the lock-up clutch 8 of the starting device 1, the torque from the engine is transmitted to the input shaft IS of the transmission through a path, that is, the front cover 3, the lock-up clutch 8, the drive member 11, the outer-side springs SP1, the first intermediate member 12, the first inner-side springs SP21, the second intermediate member 15, the second inner-side springs SP22, the driven member 16, and the damper hub 7. At this time, fluctuation of the torque input to the front cover 3 is damped (absorbed) by the outer-side springs SP1 and the first and the second inner-side springs SP21 and SP22 of the damper device 10 that mainly act in series. Therefore, in the starting device 1, it is possible to favorably damp (absorb) the fluctuation of the torque input to the front cover 3 with the damper device 10.

Furthermore, when the lock-up is performed, if the first intermediate member 12 is rotated by the torque from the engine along with rotation of the engine, each outer-side spring abutment portion 135 of the first plate member 13 of the first intermediate member 12 presses one end of the corresponding vibration absorbing spring SPd, and other end of each vibration absorbing spring SPd presses one of the corresponding spring abutment portions 235 and 245 of the mass body 21. As a result, the dynamic damper 20 including the mass body 12 and the plurality of vibration absorbing springs SPd is coupled to the first intermediate member 12 of the damper device 10. Hence, in the starting device 1, it is possible to damp (absorb) the vibration from the engine also by the dynamic damper 20, more specifically, it is possible to reduce a whole vibration level while dividing a peak of the vibration into two peaks.

In the damper device 10, the dynamic damper 20 is coupled to the first intermediate member 12. Moreover, the first inner-side springs SP21 that transmit the torque between the first intermediate member 12 and the second intermediate member 15 and the second inner-side springs SP22 that transmit the torque between the second intermediate member 15 and the driven member 16 act in series with each other. Consequently, the stiffness of the elastic bodies that transmit torque between the first intermediate member 12 and the driven member 16, that is, the synthetic spring constant of the first and the second inner-side springs SP21 and SP22 can be made smaller. Furthermore, the outer-side springs SP1 are arc coil springs, and the drive member 11 is configured so as to support each outer-side spring SP1 from the outer side and inner side in the radial direction of the damper device 10 and one side of the damper device 10 in the axial direction. In addition, the outer-side springs SP1 are disposed on radially outer side of the rivet 89 for fastening the clutch drum 81 and the drive plate 91. Thereby, a length (circumferential length) of each outer-side spring SP1 can be made longer, and it is possible to further reduce the stiffness (synthetic spring constant) of the plurality of the outer-side springs SP1 that operate in parallel between the drive member 11 and the first intermediate member 12. As a result, in the damper device 10, the first intermediate member 12 can be more likely to swing during the operation, it is thus possible to improve the vibration damping efficiency of the dynamic damper 20.

Furthermore, in the damper device 10, straight coil springs are adopted as the first and the second inner-side springs SP21 and SP22, and the first and the second inner-side springs SP21 and SP22 are disposed between the first intermediate element 12 and the second intermediate element 15 or between the second intermediate element 15 and the driven member 16 so as to restrict outward movement in the radial direction of the damper device 10 at respective both end portions. That is, in the damper device 10, when the centrifugal force acts on the first and the second inner-side springs SP21 and SP22 along with rotation of the first and the second intermediate elements 12 and 15 and rotation of the driven member 16 (or from a time point when the damper device is in an attached state), each end portion of the first and the second inner-side springs SP21 and SP22 is supported by each radial support surface 150c of the second intermediate member 15 from radially outer side. When the centrifugal force acts on the first and the second inner-side springs SP21 and SP22 (or from a time point when the damper device is in an attached state), each end portion of the second inner-side springs SP22 is supported by each first radial support portion 163c of the driven member 16, and each end portion of the first inner-side springs SP21 is supported by each second radial support portion 163d from the radially outer side.

In the second intermediate member 15, a flank surface 150e is formed on the outer side of each radial support surface 150c in the radial direction so as to be further away from each spring abutment portion 153 than the radial support surface 150c in the circumferential direction. In a state in which the damper device 10 is attached, a gap is formed between each body portion Bsp of the first and the second inner-side springs SP21 and SP22 and each inner peripheral surface 150 of the second intermediate member that is disposed on the outer side of the first and the second inner-side springs SP21 and SP22 in the radial direction, that is the flank surface 150e. Besides, in a state in which the damper device 10 is attached, each stopper surface 150s of the second intermediate member 15 and each of the first and the second radial support portions 163c and 163d of the driven member 16 face each other at intervals in the circumferential direction.

Thereby, in the damper device 10, even if the centrifugal force acting on the first and the second inner-side springs SP21 and SP22 becomes large, movement of the first and the second inner-side springs SP21 and SP22, which are straight coil springs, toward radially outer side can be restricted by the radial support surfaces 150c and the first and the second radial support portions 163c and 163d, and each body portion Bsp of the first and the second inner-side springs SP21 and SP22 can be prevented from slide-contacting with each flank surface 150e of the second intermediate member 15 and each of the first and second radial support portions 163c and 163d of the driven member 16 as much as possible. As a result, the hysteresis of the first and second inner-side springs SP21 and SP22, that is, the friction force acting on the first and second inner-side springs SP21 and SP22 when reducing load, can be reduced, it is thereby possible to favorably prevent the vibration damping efficiency of the dynamic damper 20 from being deteriorated by the hysteresis.

Accordingly, in the damper device 10, by reducing the stiffness of the outer-side springs SP1 and the first and the second inner-side springs SP21 and SP22 and reducing the hysteresis as aforementioned, it is possible to improve the vibration damping performance of the dynamic damper 20 extremely well. Here, the hysteresis of the first and the second inner-side springs SP21 and SP22 can be quantified as difference between an output torque output from the driven member 16 (output element) at the time when an input torque to the drive member 11 (input element) increases and the output torque at the time when the input torque decreases, resulting from the friction force mainly generated between the first and the second inner-side springs SP21 and SP22 (elastic bodies) and the second intermediate member 15 or the driven member 16 (rotational element).

In the present embodiment, the second intermediate member 15 and the driven member 16 are configured so that a gap is formed between each body portion Bsp (center in the axial direction) of the first and the second inner-side springs SP21 and SP22, and each flank surface 150e or each of the first and the second radial support portions 163c and 163d when the rotational speed (which is the engine rotational speed) of the drive member 11 that is coupled to a crank shaft of the engine by the lock-up clutch 8 is, for example, less than or equal to 3000 rpm. Thereby, during the time when the rotational speed of the drive member 11 is included in a low-rotational speed range of the engine that includes a lock-up rotational speed of the lock-up clutch 8 (for example, 1000 to 1500 rpm), each hysteresis of the first and the second inner-side springs SP21 and SP22 can be reduced, which makes it possible to favorably prevent the vibration damping efficiency of the dynamic damper 20 from being deteriorated by the hysteresis. However, the second intermediate member 15 and the driven member 16 may be configured so that a gap is formed between each body portion Bsp of the first and the second inner-side springs SP21 and SP22, and each flank surface 150e or each of the first and the second radial support portions 163c and 163d until the rotational speed of the drive member 11 reaches to a rotational speed that is higher than the lock-up rotational speed of the lock-up clutch 8 by at least 500 to 1000 rpm.

Furthermore, in the damper device 10, the first and the second inner-side springs SP21 and SP22 are disposed so as to be alternately side by side in the circumferential direction on the radially inner side of the outer-side springs SP1. Therefore, the centrifugal force acting on the first and the second inner-side springs SP21 and SP22 along with rotation of the first and the second intermediate members 12 and 15 and the driven member 16 can be made smaller, it is thereby possible to further reduce the hysteresis of the first and the second inner-side springs SP21 and SP22. By configuring the second intermediate member 15 so as to surround the driven member 16, the first and the second inner-side springs SP21 and SP22 are acted in series with each other while preventing the axial length of the damper device 10 from increasing, and the hysteresis of the first and the second inner-side springs SP21 and SP22 can be reduced.

In the damper device 10, the stopper surfaces 150s of the second intermediate member 15 and the first and the second radial support portions 163c and 163d of the driven member 16 are configured so as to face each other at intervals in the circumferential direction in a state in which the damper device 10 is attached. Thereby, when the centrifugal force acts on the first and the second inner-side springs SP21 and SP22, it is possible to configure the stopper 19 interposed between the third elements that restricts relative rotation between the second intermediate member 15 and the driven member 16 while preventing each body portion Bsp described above from slide-contacting with each flank surface 150e or each of first and second radial support portions 163c and 163d as much as possible.

In the starting device 1, since the turbine runner 5 is coupled (fixed) to the driven member 16 of the damper device 10, when the lock-up is performed, the turbine runner 5 that is not concerned in transmitting the torque between the front cover 3 and the input shaft IS of the transmission functions as a so-called turbine damper. Therefore, when the lock-up is performed, it is possible to favorably absorb the vibration of the driven member 16, which in turn absorb the vibration of the damper device 10 as a whole, by the turbine damper configured by the turbine runner 5.

Furthermore, in the starting device 1, the dynamic damper 20 that includes the mass body 21 and the vibration absorbing springs SPd is coupled to the first intermediate member 12 of the damper device 10. The mass body 21 of the dynamic damper 20 includes the first and the second weight bodies 23 and 24 that are coupled to each other via the rivets (fastening members) 25, and the vibration absorbing springs SPd are disposed at intervals in the circumferential direction between the first and the second weight bodies 23 and 24. The rivets 25 that couple the first and the second weight bodies 23 and 24 are disposed between the vibration absorbing springs SPd that are adjacent to each other so as to be side by side with the vibration absorbing springs SPd in the circumferential direction.

As described above, by disposing vibration absorbing springs SPd of the dynamic damper 20 between the first and the second weight bodies 23 and 24 that configure the mass body 21 at intervals in the circumferential direction, it is possible to reduce a space occupied by the dynamic damper 20 by disposing the mass body 21 and the vibration absorbing springs SPd closer to each other. Moreover, in the starting device 1, a region in the vicinity of the outer periphery portion of the turbine runner 5 that tends to be a dead space can be effectively utilized as a space for disposing the dynamic damper 20, that is, the mass body 21 and the vibration absorbing springs SPd, and space efficiency in an entire device can be improved. Furthermore, by disposing the rivets between the vibration absorbing springs SPd that are adjacent to each other so as to be side by side with the vibration absorbing springs SPd in the circumferential direction, it is possible to easily reduce the stiffness by enlarging the diameter of the vibration absorbing springs SPd (coil diameter) and to further increase the inertia of the mass body 21 including the rivets 25 as compared to a case in which, for example, the rivets 25 are disposed on the radially inner side of the vibration absorbing springs SPd. As a result, in the damper device 10 including the dynamic damper 20, it is possible to improve the vibration damping performance while preventing the entire device from increasing.

In the above-mentioned embodiment, a projecting portion as a radial support portion that is fitted into an inside of each end portion of the corresponding first and second inner-side springs SP21 and SP22 (in case of a parent spring, a coil spring outside or inside) may be formed in each spring abutment portion 153 of the second intermediate member 15 or each spring abutment portion 163 of the driven member 16. In such a case, each radial support surface 150c of the second intermediate member 15 may be formed at the substantially same radially outer side position as a position where each flank surface 150e is formed, and the radial support portions 163c and 163d of the driven member 16 may be omitted. Moreover, the first and the second weight bodies 23 and 24 may be divided into plural in the circumferential direction so that a plural of the mass bodies 21 is provided, for example, for each vibration absorbing spring SPd. Furthermore, in the above-mentioned embodiment, the stoppers 18 and 19 respectively interposed between the second elements and between the third elements may be configured so as to restrict relative rotation between the first and the second intermediate members 12 and 15 and relative rotation between the second intermediate member 15 and the driven member 16 respectively at the different timing.

Figure 5:
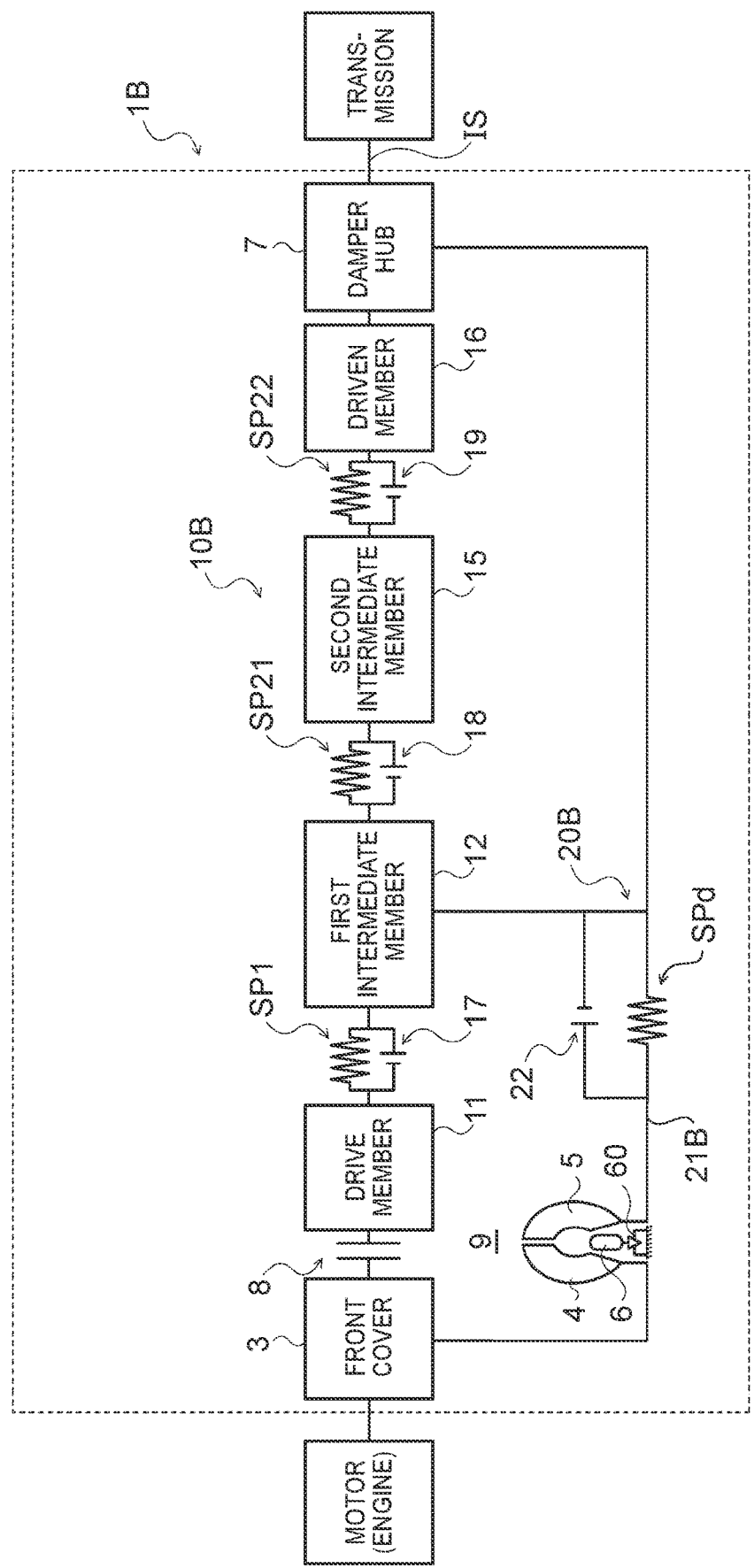
FIG. 5 is schematic configuration view illustrating a starting device that includes a damper device according to another embodiment of the present disclosure.
Figure 6:
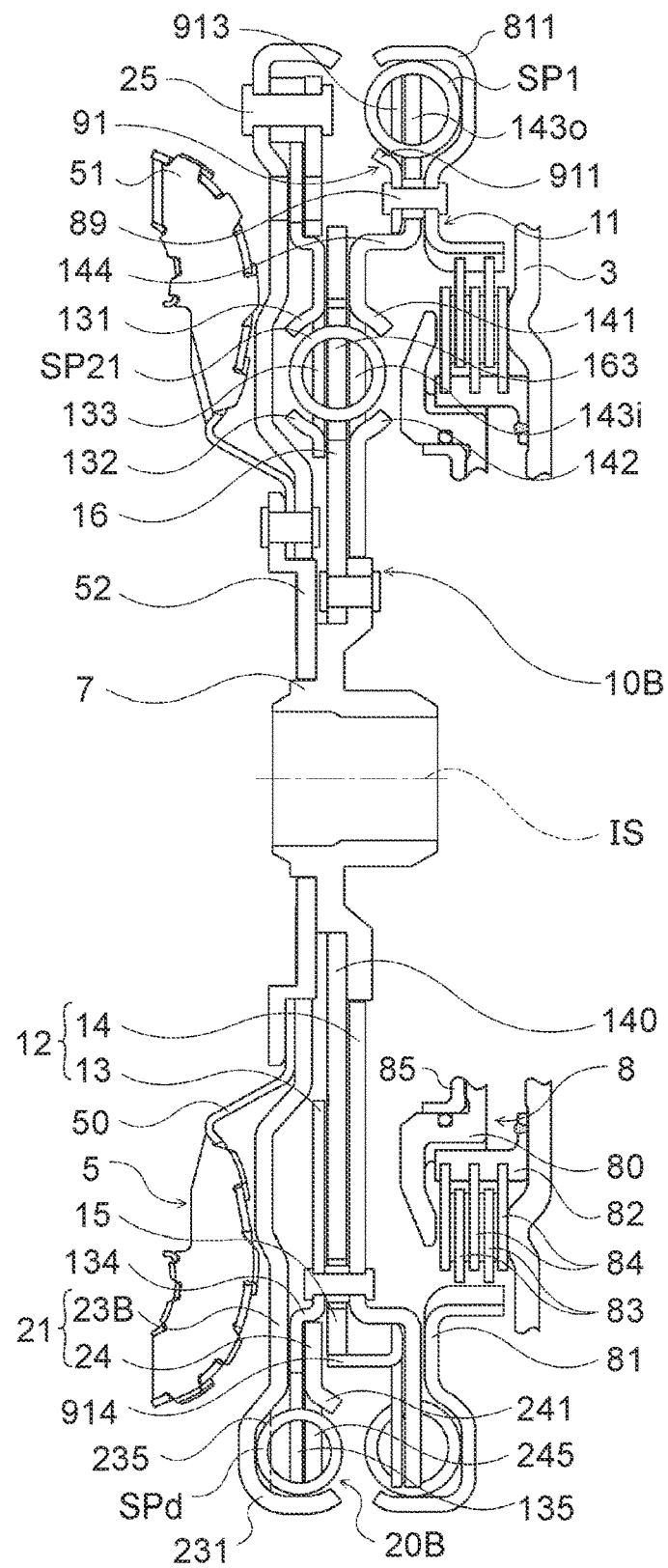
FIG. 6 is a cross-sectional view illustrating a damper device according to the other embodiment of the present disclosure.

Furthermore, as a damper device 10B of a starting device 1B illustrated in FIG. 5, by replacing the aforementioned mass body 21 with a mass body 21B as a coupling member including a first weight body 23B illustrated in FIG. 6, it is possible to configure a dynamic damper 20B that includes as a mass body the turbine runner 5 and the first and the second weight bodies 23B and 24 as the coupling member. Thus, by using the turbine runner 5 as a mass body of the dynamic damper 20B, it is possible to favorably prevent the damper device 10B, which in turn prevent the starting device 1B as a whole, from increasing in size. The first weight body 23B illustrated in FIG. 6 includes an inside diameter that is substantially the same as that of the turbine runner 5 (turbine shell 50) and an outside diameter that is larger than the turbine runner 5, and corresponds to a weight body of which an inside diameter is further smaller than that of the aforementioned first weight body 23.

The first weight body 23B also includes a plurality of first spring support portions 231 and a plurality of first spring abutment portions (elastic body abutment portions) 235 that are configured in the same manner as those of the first weight body 23. The first weight body 23B is disposed between the turbine runner 5 and the first plate member 13 of the first intermediate member 12, and an inner peripheral portion thereof is fixed to a turbine hub 52 via a rivet together with an inner peripheral portion of a turbine shell 50. Moreover, the turbine hub 52, as illustrated in drawings, is rotatably supported by the damper hub 7. In such a dynamic damper 20B, the plurality of rivets that are the fastening members for coupling the first and the second weight bodies 23B and 24 and the outer spring abutment portions 135 of the first plate member 13 configure a stopper interposed between third elements for restricting relative rotation between the first and the second weight bodies 23B and 24 and the first plate member 13 before each vibration absorbing spring SPd is completely contracted.

As explained above, the damper device according to the present disclosure is a damper device including an input element, a first intermediate element, a second intermediate element, an output element, a plurality of first elastic bodies that transmits torque between the input element and the first intermediate element, a plurality of second elastic bodies that transmits torque between the first intermediate element and the second intermediate element, a plurality of third elastic bodies that acts in series with the second elastic bodies and transmits torque between the second intermediate element and the output element, and a dynamic damper that includes a mass body and vibration absorbing elastic bodies, wherein the dynamic damper is coupled to the first intermediate element, the second and the third elastic bodies are straight coil springs disposed between the first intermediate element and the second intermediate element or between the second intermediate element and the output element so that outward movement of the second and the third elastic bodies in a radial direction of the damper device is restricted at respective both end portions, and a gap is formed between each body portion of the second and the third elastic bodies and each member disposed on an outer side of the second and the third elastic bodies in the radial direction.

In this damper device, the dynamic damper is coupled to the first intermediate element. In addition, the second elastic bodies that transmit torque between the first intermediate element and the second intermediate element and the third elastic bodies that transmit torque between the second intermediate element and the output element act in series with each other. Thereby, the stiffness of the elastic bodies that transmit torque between the first intermediate element and the output element, that is, the synthetic spring constant of the second and the third elastic bodies, can be made smaller. Therefore, the first intermediate member is more likely to swing during the operation of the damper device such that the vibration damping efficiency of the dynamic damper can be further improved. Furthermore, in this damper device, straight coil springs are adopted as the second and the third elastic bodies. In addition, the second and the third elastic bodies are disposed between the first intermediate element and the second intermediate element or between the second intermediate element and the output element so as to restrict outward movement of the second and the third elastic bodies in a radial direction of the damper device at each end portion. Besides, a gap is formed between each body portion of the second and the third elastic bodies and each member disposed on the outer side of the second and the third elastic bodies in the radial direction. Thereby, when the centrifugal force acts on the second and the third elastic bodies along with rotation of the first and the second intermediate elements and the output element, each body portion of the second and the third elastic bodies can be prevented from slide-contacting with each member disposed on the outer side of the second and the third elastic bodies in the radial direction as much as possible. As a result, the hysteresis of the second and the third elastic bodies is reduced, and it is possible to favorably suppress deterioration of the vibration damping effect of the dynamic damper due to the hysteresis. Accordingly, in this damper device, it is possible to extremely favorably improve the vibration damping performance of the dynamic damper.

The second and the third elastic bodies may be disposed on the inner side of the first elastic bodies in the radial direction so as to be alternately side by side in the circumferential direction of the damper device. Thereby, the centrifugal force acting on the second and the third elastic bodies along with rotation of the first and the second intermediate members and the output member can be made smaller, which makes it possible to further reduce the hysteresis of the second and the third elastic bodies.

Furthermore, the first elastic bodies may be arc coil springs, and the input element may include at least one member that supports the first elastic bodies from the outer side in the radial direction and from one side in an axial direction of the damper device. Thereby, it is possible to make a length (circumferential length) of each first elastic body longer and the stiffness of the plurality of the first elastic bodies that acts in parallel between the input element and the first intermediate element can be further reduced, and the first intermediate member can be more likely to swing during the operation of the damper device.

The input element may include a first member that supports at least an outer peripheral portion and a side portion of the one side of each first elastic body, and a second member that is coupled to the first member via a plurality of fastening tools and supports at least an inner peripheral side of a side portion on an opposite side of the first elastic body from the one side, and the fastening tools may be disposed on radially inner side of the first elastic bodies. Thereby, it is possible to reduce the stiffness of the first elastic bodies by disposing the first elastic bodies on further outer peripheral side of the damper device.

Furthermore, the second intermediate member may be an annular member that surrounds the output element, and may include a plurality of intermediate-side abutment portions each projecting from an inner peripheral surface of the second intermediate element towards the center and each abutting, between the second and the third elastic bodies that are adjacent to each other, against each end surfaces of the the second and the third elastic bodies, and a gap may be formed between each body portion of the second and the third elastic bodies and each inner peripheral surface of the second intermediate element. Thereby, it is possible to make the second and the third elastic bodies act in series with each other while preventing the damper device from increasing in the axial length, which makes it possible to reduce the hysteresis of the second and the third elastic bodies.

The inner peripheral surface of the second intermediate element may include a plurality of radial support surfaces that is formed on both sides of the intermediate-side abutment portions in the circumferential direction and supports an outer peripheral surface of each end portion of the second or the third elastic bodies from the outer side in the radial direction, and a plurality of flank surfaces each positioning on the outer side of the radial support surfaces in the radial direction and each being formed so as to be away from the intermediate-side abutment portions with respect to the radial support surfaces in the circumferential direction.

Thereby, each end portion of the second and the third elastic bodies is supported by each of the radial support surfaces of the second intermediate member, which makes it possible to restrict outward movement of the second and the third elastic bodies in the radial direction. Besides, by forming each of the flank surfaces in the second intermediate element on the outer side of the radial support surfaces in the radial direction so as to be further away from the intermediate-abutment portions than the radial support surfaces in the circumferential direction, each body portion of the second and the third elastic bodies can be prevented from slide-contacting with each flank surface as much as possible when the centrifugal force acts on the second and the third elastic bodies. Each radial support surface may be configured so as to abut against an outer peripheral surface of each end portion of the second or the third elastic bodies when the centrifugal force acts on the second and the third elastic bodies and, in a state in which the damper device is attached, may abut from the radially outer side against a range corresponding to, for example, a length of a coil for one turn from each end portion of the second or the third elastic bodies.

Furthermore, the output element may include a plurality of output-side abutment portions each projecting from an outer peripheral surface of the output element toward outer side in the radial direction so as to abut against each end surface of the third elastic bodies, each of the output-side abutment portions may include an abutment surface that abuts against each end surface of the third elastic bodies and a radial support portion that projects in the circumferential direction on the outer side of the abutment surface in the radial direction and supports an outer peripheral surface of each end portion of the third elastic bodies from the outer side in the radial direction, and, in a state in which the damper device is attached, a part of the second intermediate member and each radial support portion of the output element may face each other at intervals in the circumferential direction.

Thereby, each end portion of the third elastic bodies is supported by each radial support portion of the output member, which makes it possible to restrict outward movement of the third elastic bodies in the radial direction. Beside, in a state in which the damper device is attached, by making the part of the second intermediate member and each radial support portion of the output element face each other at intervals in the circumferential direction, it is possible to prevent each body portion of the third elastic bodies from slide-contacting with each radial support portion of the output element as much as possible when the centrifugal force acts on the third elastic bodies. Besides, each radial support portion may be configured so as to abut against the outer peripheral surface of each end portion of the third elastic bodies when the centrifugal force acts on the third elastic bodies and, in a state in which the damper device is attached, may abut from the radially outer side against a range corresponding to, for example, a length of a coil for one turn from each end portion of the third elastic bodies.

Each of the output-side abutment portions may include a second abutment surface that abuts against each of the end surface of the second elastic bodies on an opposite side from the abutment surface and a second radial support portion that projects in the circumferential direction on the outer side of the second abutment surface in the radial direction and supports an outer peripheral surface of each end portion of the second elastic bodies from the outer side in the radial direction, and, in a state in which the damper device is attached, a part of the second intermediate member and the second radial support portion of the output element may face each other at intervals in the circumferential direction.

Thereby, each end portion of the second elastic bodies is supported by the second radial support portion of the output element, which makes it possible to restrict outward movement of the second elastic bodies in the radial direction. Beside, in a state in which the damper device is attached, by making a part of the second intermediate member and the second radial support portion of the output element face each other at intervals in the circumferential direction, it is possible to prevent each body portions of the second elastic bodies from slide-contacting with the second radial support portion of the output element as much as possible when the centrifugal force acts on the second elastic bodies. Besides, the second radial support portion may be configured so as to abut against the outer peripheral surface of each end portion of the second elastic bodies when the centrifugal force acts on the second elastic bodies, and, in a state in which the damper device is attached, may abut from the radially outer side against a range corresponding to, for example, a length of a coil for one turn from each end portion of the second elastic bodies.

Furthermore, the inner peripheral surface of the second intermediate element may include stopper surfaces that each extend from an end portion that is in an opposite side of the flank surface from the radial support surface toward an outer peripheral surface of the second intermediate element and facing surfaces that each extend in the circumferential direction from an end portion that is closer to the outer peripheral surface of each stopper surface and each face an outer peripheral surface of each output-side abutment portion at intervals in the radial direction, and each stopper surface of the second intermediate member and the radial support portion of the output element may face each other at intervals in the circumferential direction in a state in which the damper device is attached and may configure a stopper for restricting relative rotation between the second intermediate element and the output element. Thereby, when the centrifugal force acts on the second and the third elastic bodies, it is possible to configure a stopper for restricting relative rotation between the second intermediate element and the output element while preventing each body portion of the second and the third elastic bodies from slide-contacting with each flank surface of the second intermediate element and each radial support portion of the output element as much as possible.

The input element may be coupled to an output shaft of an internal combustion engine by a lock-up clutch, a gap may be formed between each body portion of the second and the third elastic bodies and each member that is disposed on the radially outer side of the second and the third elastic bodies until the rotational speed of the input element reaches to a rotational speed that is higher than the lock-up rotational speed of the lock-up clutch for at least 500 to 1000 rpm. Thereby, during the time when the rotational speed of the input element is included in a low-rotational speed region of the internal combustion engine including the lock-up rotational speed, the hysteresis of the second and the third elastic bodies is reduced, which makes it possible to favorably prevent the vibration damping efficiency of the dynamic damper from being deteriorated due to the hysteresis.

Furthermore, the mass body of the dynamic damper may include a pump impeller and a turbine runner that configures a fluid transmission device. Thereby, it is possible to favorably prevent the entire damper device from increasing in size.

The mass body of the dynamic damper may include two weight bodies that are coupled to each other by fastening members, the vibration absorbing elastic bodies may be disposed between the two weight bodies at intervals in the circumferential direction, and each of the fastening members may be disposed between the vibration absorbing elastic bodies that are adjacent to each other so as to be side by side with the vibration absorbing elastic bodies in the circumferential direction.

As described above, by disposing the vibration absorbing elastic bodies of the dynamic damper between two weight bodies configuring the mass body at intervals in the circumferential direction, the mass body and the vibration absorbing elastic bodies are disposed so as to be closer to each other, it is therefore possible to reduce the space occupied by the dynamic damper. Besides, by disposing each of the fastening members between the vibration absorbing elastic bodies that are adjacent to each other so as to be side by side with the vibration absorbing elastic bodies in the circumferential direction, it is possible to easily reduce the stiffness of the vibration absorbing elastic bodies and to increase the inertia of the mass body including the fastening members as compared to a case in which, for example, the fastening members are disposed on a radially inner side of the vibration absorbing elastic bodies. As a result, in the damper device including the dynamic damper, it is possible to improve the vibration damping performance while preventing the entire device from increasing in size.

The present disclosure is not in any way limited to the embodiments described above, and various modification can be obviously made within the breadth of the present disclosure. The above described embodiments to carry out the disclosure are merely specific embodiments of the disclosure described in the "SUMMARY" section, and do not limit the elements of the disclosure described in the "SUMMARY" section.

INDUSTRIAL APPLICABILITY

The present disclosure can be applied to, for example a manufacturing field and the like of a damper device.

The invention claimed is:

1. A damper device comprising:
an input element;
a first intermediate element;
a second intermediate element;
an output element;
a plurality of first elastic bodies that transmits torque between the input element and the first intermediate element;
a plurality of second elastic bodies that transmits torque between the first intermediate element and the second intermediate element;
a plurality of third elastic bodies that acts in series with the second elastic bodies and transmits torque between the second intermediate element and the output element; and
a dynamic damper that includes a mass body and vibration absorbing elastic bodies, wherein
the vibration absorbing elastic bodies of the dynamic damper are directly coupled to the first intermediate element;
the second elastic bodies are straight coil springs disposed between the first intermediate element and the second intermediate element and the third elastic bodies are straight coil springs disposed between the second intermediate element and the output element so that outward movement of the second and the third elastic bodies in a radial direction of the damper device is restricted at respective both end portions; and
a gap is formed between each body portion of the second and the third elastic bodies and a corresponding one of the second intermediate element and the output element disposed on an outer side of each of the second and the third elastic bodies in the radial direction,
wherein damper device is configured so that torque is transferred in an order such that the torque is transferred from the input element to the first intermediate element, the torque transferred to the first intermediate element is then transferred to the second intermediate element, and then the torque transferred to the second intermediate element is transferred to the output element.

2. The damper device according to claim 1, wherein the second and the third elastic bodies are disposed on an inner side of the first elastic bodies in the radial direction so as to be alternately side by side in a circumferential direction of the damper device.

3. The damper device according to claim 1, wherein the first elastic bodies are arc coil springs; and
the input element includes at least one member that supports the first elastic bodies from an outer side in the radial direction and from one side in an axial direction of the damper device.

4. The damper device according to claim 3, wherein the input element includes the at least one member that supports at least an outer peripheral portion and a side portion of the one side of each of the first elastic bodies, and a second member that is coupled to the at least one member via a plurality of fastening tools and supports at least an inner peripheral side of a side portion on an opposite side from the one side of each of the first elastic bodies; and
the plurality of fastening tools is disposed on a radially inner side of the first elastic bodies.

5. The damper device according to claim 1, wherein the second intermediate element is an annular member that surrounds the output element, and includes a plurality of intermediate-side abutment portions each projecting from an inner peripheral surface of the second intermediate element inward radially and each abutting, between the second and the third elastic bodies that are adjacent to each other, against each end surface of the second and the third elastic bodies; and
the gap is formed between each body portion of the second and the third elastic bodies and the inner peripheral surface of the second intermediate element.

6. The damper device according to claim 5, wherein the inner peripheral surface of the second intermediate element includes:
a plurality of radial support surfaces that is each formed on both sides of each of the intermediate-side abutment portions in the circumferential direction and each supports an outer peripheral surface of each end portion of the second or the third elastic bodies from the outer side in the radial direction; and
a plurality of flank surfaces each being positioned on an outer side of each of the radial support surfaces in the radial direction and each being formed so as to be further away from each of the intermediate-side abutment portions than each of the radial support surfaces in the circumferential direction.

7. The damper device according to claim 6, wherein the output element includes a plurality of output-side abutment portions each projecting from an outer peripheral surface of the output element toward an outer side in the radial direction so as to abut against each end surface of the third elastic bodies;
each of the output-side abutment portions includes an abutment surface that abuts against each of the end surfaces of the third elastic bodies, and a radial support portion that projects in the circumferential direction on an outer side of the abutment surface in the radial direction and supports an outer peripheral surface of each end portion of the third elastic bodies from an outer side in the radial direction; and
in a state in which the damper device is attached, a part of the second intermediate member and each of the radial support portions of the output element face each other at intervals in the circumferential direction.

8. The damper device according to claim 7, wherein each of the output-side abutment portions further includes a second abutment surface that abuts against the each of the end surfaces of the second elastic bodies on an opposite side from the abutment surface, and a second radial support portion that projects in the circumferential direction on an outer side of the second abutment surface in the radial direction and supports an outer peripheral surface of each end portion of the second elastic bodies from an outer side in the radial direction; and
in a state in which the damper device is attached, a part of the second intermediate member and each of the second radial support portions face each other at intervals in the circumferential direction.

9. The damper device according to claim 7, wherein
the inner peripheral surface of the second intermediate member includes stopper surfaces that each extends from an end portion on an opposite side of each of the flank surfaces from the radial support surface side toward an outer peripheral surface of the second intermediate member, and facing surfaces that each extends from an end portion of each of the stopper surfaces that is closer to the outer peripheral surface and each faces an outer peripheral surface of each of the output side abutment portion at intervals in the circumferential direction; and
each of the stopper surfaces of the second intermediate member and each of the radial support portions of the output element face each other at intervals in the circumferential direction in a state in which the damper device is attached, and configure a stopper that restricts relative rotation between the second intermediate member and the output element.

10. The damper device according to claim 1, wherein
the input element is coupled to an output shaft of an internal combustion engine by a lock-up clutch; and
during a period of time until a rotational speed of the input element reaches a rotational speed that is higher than a lock-up rotational speed of the lock-up clutch by at least 500 to 1000 rpm, a gap is formed between each body portion of the second and the third elastic bodies and each member disposed on an outer side of the second and the third elastic bodies in the radial direction.

11. The damper device according to claim 1, wherein
the mass body of the dynamic damper includes a turbine runner that configures a fluid transmission device with a pump impeller.

12. The damper device according to claim 1, wherein
the mass body of the dynamic damper includes two weight bodies that are coupled to each other by fastening members;
the vibration absorbing elastic bodies are disposed between the two weight bodies at intervals in the circumferential direction; and
each of the fastening members is disposed between the vibration absorbing elastic bodies that are adjacent to each other so as to be side by side with each of the vibration absorbing elastic bodies in the circumferential direction.

13. The damper device according to claim 2, wherein
the first elastic bodies are arc coil springs; and
the input element includes at least one member that supports the first elastic bodies from an outer side in the radial direction and from one side in an axial direction of the damper device.

14. The damper device according to claim 13, wherein
the input element includes a first member that supports at least an outer peripheral portion and a side portion of the one side of each of the first elastic bodies, and a second member that is coupled to the first member via a plurality of fastening tools and supports at least an inner peripheral side of a side portion on an opposite side from the one side of each of the first elastic bodies; and
the plurality of fastening tools is disposed on a radially inner side of the first elastic bodies.

15. The damper device according to claim 14, wherein
the second intermediate element is an annular member that surrounds the output element, and includes a plurality of intermediate-side abutment portions each projecting from an inner peripheral surface of the second intermediate element towards the center and each abutting, between the second and the third elastic bodies that are adjacent to each other, against each end surface of the second and the third elastic bodies; and
a gap is formed between each body portion of the second and the third elastic bodies and the inner peripheral surface of the second intermediate element.

16. The damper device according to claim 15, wherein
the inner peripheral surface of the second intermediate element includes:
a plurality of radial support surfaces that is each formed on both sides of each of the intermediate-side abutment portions in the circumferential direction and each supports an outer peripheral surface of each end portion of the second or the third elastic bodies from the outer side in the radial direction; and
a plurality of flank surfaces each being positioned on an outer side of each of the radial support surfaces in the radial direction and each being formed so as to be further away from each of the intermediate-side abutment portions than each of the radial support surfaces in the circumferential direction.

17. The damper device according to claim 16, wherein
the output element includes a plurality of output-side abutment portions each projecting from an outer peripheral surface of the output element toward an outer side in the radial direction so as to abut against each end surface of the third elastic bodies;
each of the output-side abutment portions includes an abutment surface that abuts against each of the end surfaces of the third elastic bodies, and a radial support portion that projects in the circumferential direction on an outer side of the abutment surface in the radial direction and supports an outer peripheral surface of each end portion of the third elastic bodies from an outer side in the radial direction; and
in a state in which the damper device is attached, a part of the second intermediate member and each of the radial support portions of the output element face each other at intervals in the circumferential direction.

18. The damper device according to claim 17, wherein
each of the output-side abutment portions further includes a second abutment surface that abuts against the each of the end surfaces of the second elastic bodies on an opposite side from the abutment surface, and a second radial support portion that projects in the circumferential direction on an outer side of the second abutment surface in the radial direction and supports an outer peripheral surface of each end portion of the second elastic bodies from an outer side in the radial direction; and
in a state in which the damper device is attached, a part of the second intermediate member and each of the second radial support portions face each other at intervals in the circumferential direction.

19. The damper device according to claim 18, wherein
the inner peripheral surface of the second intermediate member includes stopper surfaces that each extends from an end portion on an opposite side of each of the flank surfaces from the radial support surface side toward an outer peripheral surface of the second intermediate member, and facing surfaces that each extends from an end portion of each of the stopper surfaces that is closer to the outer peripheral surface and each faces an outer peripheral surface of each of the output side abutment portion at intervals in the circumferential direction; and each of the stopper surfaces of the second intermediate member and each of the radial support portions of the output element face each other at intervals in the circumferential direction in a state in which the damper device is attached, and configure a stopper that restricts relative rotation between the second intermediate member and the output element.

20. The damper device according to claim 19, wherein the input element is coupled to an output shaft of an internal combustion engine by a lock-up clutch; and during a period of time until a rotational speed of the input element reaches a rotational speed that is higher than a lock-up rotational speed of the lock-up clutch by at least 500 to 1000 rpm, a gap is formed between each body portion of the second and the third elastic bodies and each member disposed on an outer side of the second and the third elastic bodies in the radial direction.

* * * * *